(12) United States Patent
Röhm

(10) Patent No.: US 6,536,782 B2
(45) Date of Patent: Mar. 25, 2003

(54) QUICK-RELEASE DRILL CHUCK

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 10/112,886

(22) Filed: Apr. 1, 2002

(65) Prior Publication Data

US 2002/0140185 A1 Oct. 3, 2002

(30) Foreign Application Priority Data

Apr. 2, 2001 (DE) ...................................... 201 05 763 U

(51) Int. Cl.⁷ ........................ B23B 31/107; B23B 31/12; B23B 31/22
(52) U.S. Cl. ............................. 279/62; 279/71; 279/75; 408/239 R
(58) Field of Search .............................. 279/22, 29, 30, 279/71, 72, 74, 75, 76, 81, 82, 60–65, 902, 904–906, 143–145, 158; 408/239 R, 239 A, 240; 403/377, DIG. 6

(56) References Cited

U.S. PATENT DOCUMENTS

| | | | | |
|---|---|---|---|---|
| 3,929,343 A | * | 12/1975 | Wanner et al. ................ 279/62 |
| 4,775,269 A | * | 10/1988 | Brix ....................... 408/239 R |
| 4,824,298 A | * | 4/1989 | Lippacher et al. ........... 408/240 |
| 5,180,261 A | * | 1/1993 | Schreiber ................ 408/239 R |
| 5,199,833 A | * | 4/1993 | Fehrle et al. ............ 408/239 R |
| 5,342,154 A | * | 8/1994 | Holzer ....................... 408/240 |
| 5,603,516 A | * | 2/1997 | Neumaier ..................... 279/75 |
| 5,951,026 A | * | 9/1999 | Harman, Jr. et al. ......... 279/143 |

FOREIGN PATENT DOCUMENTS

| AT | 233355 A | * 9/1963 | ................... 279/62 |
|---|---|---|---|
| DE | 200 16 090 | 12/2000 | ................... 279/74 |

* cited by examiner

Primary Examiner—Steven C. Bishop
(74) Attorney, Agent, or Firm—Herbert Dubno; Andrew Wilford

(57) ABSTRACT

A chuck has a body centered on an axis and formed with a rearwardly open bore adapted to fit with a drive spindle. Respective jaws are displaceable in angled guides of the body and a ring rotatable on the body has an internal screwthread meshing with the jaws for moving the jaws between their end positions on rotation of the ring. A latch element is radially displaceable on the body between a holding position projecting radially into the bore and locking the spindle therein and a freeing position clear of the bore. A sleeve is displaceable between a latched position forcing the element into the holding position and an unlatched position allowing it to move into the freeing position. A spring between the sleeve and the body urges the sleeve into the latched position. The spring is mostly forward of rear ends of the jaws in the rear-end positions thereof.

11 Claims, 6 Drawing Sheets

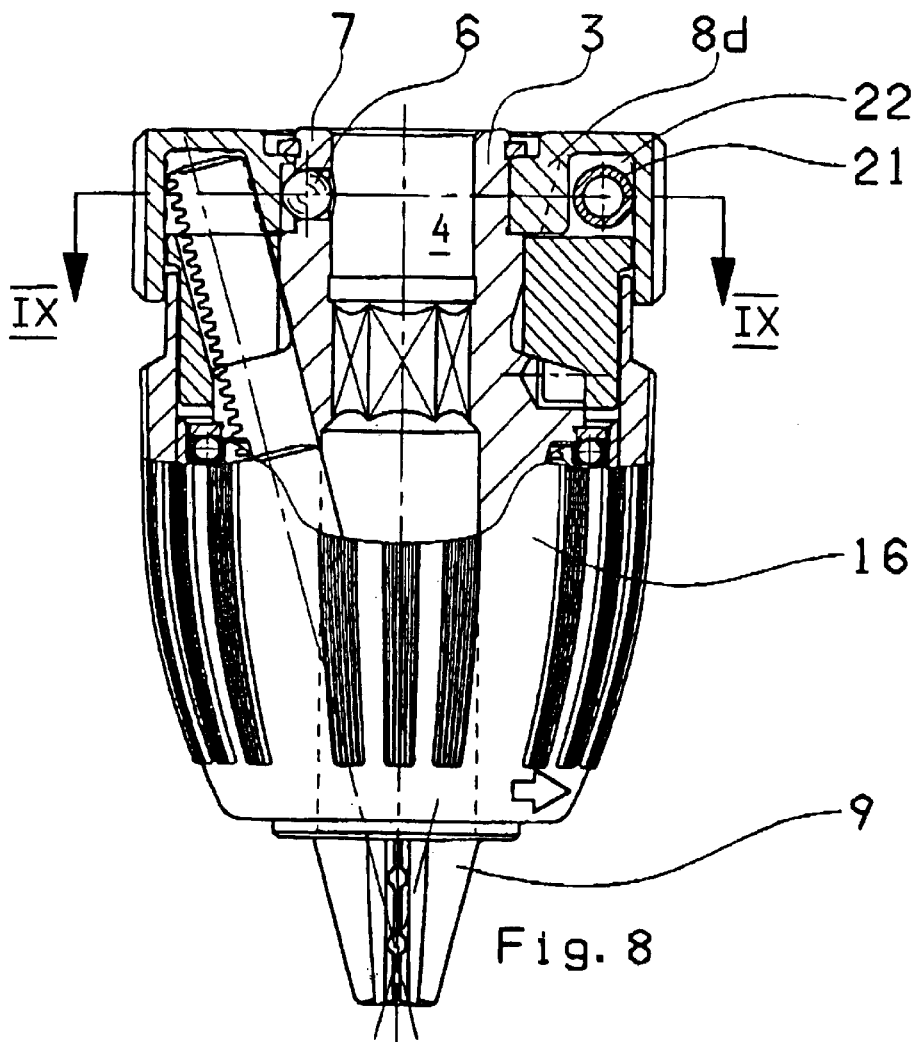
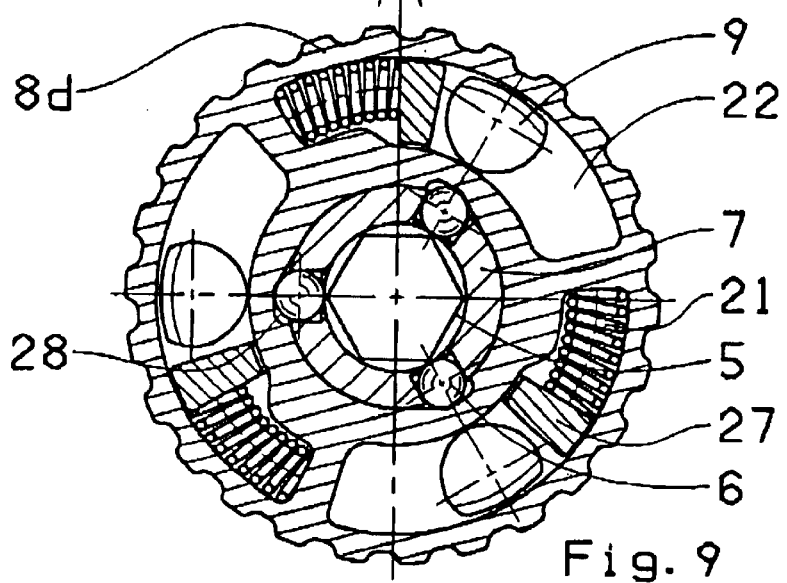

QUICK-RELEASE DRILL CHUCK

FIELD OF THE INVENTION

The present invention relates to a drill chuck. More particularly this invention concerns such a chuck which can be easily removed from its drive spindle.

BACKGROUND OF THE INVENTION

In order to switch between different tools it is known to make a drill chuck so that it can be quickly loosened and tightened, or to make the chuck and tool such that they can be snapped together and apart readily. Thus the user can, for instance, switch between a drill bit for making a screw hole and a driver bit for setting a screw in the hole.

Another solution proposed in German utility model 200 16 090 published Nov. 16, 2000 is to provide a standard three-jaw chuck with mechanism that allows the entire chuck to be taken off its drive spindle and swapped with another such chuck, presumably holding a different tool. This system is particularly handy when round-shank tools are being employed that have to be clamped solidly so that simply dechucking and rechucking them is not quickly done and where a tool, e.g. a chuck key, is often needed.

To achieve this object the chuck body has a rearwardly open bore shaped to fit complementarily with a nonround drive spindle. A radially displaceable latch element in the chuck body can be moved from a holding position engaged radially inward into a radially outwardly open seat in the drive spindle to an unlatched position clear of this seat. When the latch element is engaged in the seat the spindle is locked axially to the chuck body and when in the freeing position the chuck can be taken off the spindle.

The main disadvantage of this type of quick-release mechanism is that it adds considerably to the overall length of the drill chuck. A chuck's length is at a minimum equal to the distance between the front end of the chuck body and the rear ends of the jaws in the rear end, maximum-spread position of the jaws. The quick-release mechanism must be at the rear end of the chuck and invariably takes up some extra space here. This makes the drill using the chuck overlong and front-end heavy.

OBJECTS OF THE INVENTION

It is therefore an object of the present invention to provide an improved quick-release drill chuck.

Another object is the provision of such an improved quick-release drill chuck which overcomes the above-given disadvantages, that is which can easily be taken off and locked on a drive spindle, but that has an axial dimension that is no greater than a standard permanent-mount chuck.

SUMMARY OF THE INVENTION

A chuck releasably securable to a drive spindle has according to the invention a chuck body centered on an axis and formed with a rearwardly open bore adapted to fit with the drive spindle and a plurality of forwardly open, angularly spaced, and inwardly angled guides. Respective jaws are displaceable in the guides between relatively widely spaced rear end positions and relatively closely spaced front end positions. A ring rotatable on the body has an internal screwthread meshing with the jaws for displacement of the jaws between their positions on rotation of the ring. A latch element is radially displaceable on the body between a holding position projecting radially into the bore and locking the spindle therein and a freeing position clear of the bore and permitting the spindle to withdraw from the bore. A latch sleeve engageable with the latch element is displaceable on the body between a latched position forcing the element into the holding position and an unlatched position allowing the element to move into the freeing position. A spring braced between the latch sleeve and the body urges the latch sleeve into the latched position. The spring is mostly forward of rear ends of the jaws in the rear-end positions thereof.

Thus the biasing spring according to the invention does not take up any significant room and the chuck according to the invention can be of a length comparable to a standard permanently mounted chuck. The biasing spring is located generally level with the jaws so that the sleeve can replace the standard rear-end cap and does not add anything significant to the chuck's length.

According to the invention the spring lies wholly forward of rear ends of the jaws in the rear-end positions thereof. In this embodiment the chuck is the same length as a standard permanently mounted chuck.

The sleeve in accordance with the invention is axially displaceable between its positions and the spring is an axially extending coil spring centered on the axis and having a rear end braced axially against the latch sleeve and front end braced axially against the chuck body. In this case the sleeve has a shoulder bearing on the rear end of the spring and the chuck body is provided with a snap ring against which the front end of the spring bears. The spring is of frustoconical shape with a taper corresponding to an angle the guides form with the axis.

In another system according to the invention the sleeve is angularly displaceable between its positions and the spring has one end braced angularly against the latch sleeve and an opposite end braced angularly against the chuck body so that the spring itself extends angularly. Normally there are a plurality of the springs and the sleeve and chuck body form respective angularly extending pockets receiving the springs. The jaws can dip back into these pockets when fully retracted, making the structure very compact.

The sleeve can have a plastic outer part and a metallic inner part engageable with the element. This construction reduces mass of the sleeve and keeps the chuck as light as possible. Normally the element is a plurality of balls radially displaceable in respective angularly equispaced passages in the chuck body. These balls themselves are axially forward of the rear ends of the jaws in their rear-end positions so that they also do not add any length to the chuck.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 8 is an axial section through the third chuck according to the invention in the unlatched position; and FIG. 9 is a section taken along line IX—IX of FIG. 8.

SPECIFIC DESCRIPTION

Figure 1:
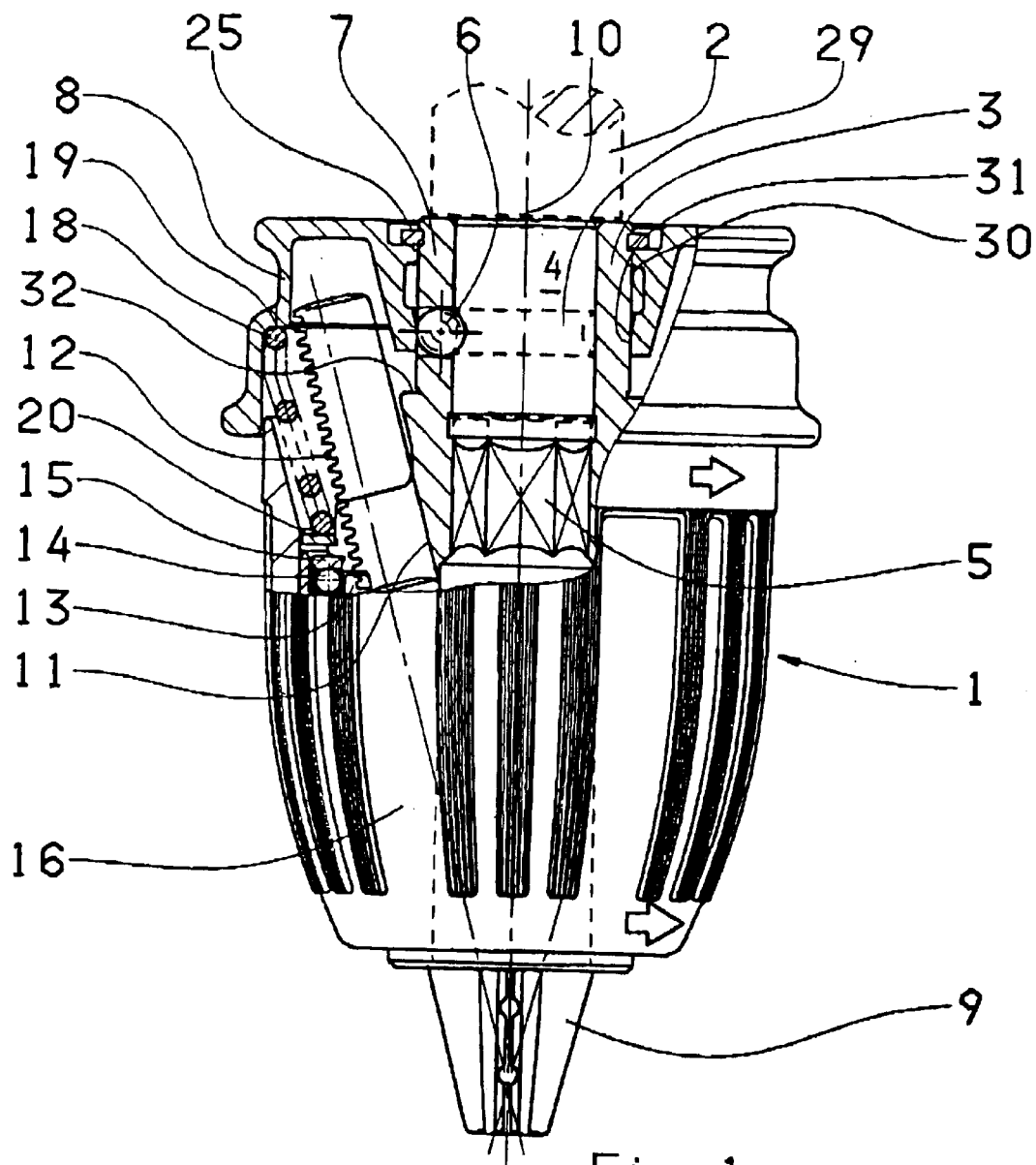
FIG. 1 is an axial section through a chuck according to the invention.

As seen in FIG. 1a chuck 1 according to the invention has a chuck body 3 centered on an axis 10 and having a rearwardly open bore 4 with a faceted or polygonal-section front end portion 5 adapted to fit complementarily with a spindle shown schematically at 2. Three angularly equispaced balls 6 are radially displaceable in radial passages 7 formed in the body 3 between the illustrated inner holding positions in which they project into the bore 4 and engage radially into a radially outwardly 10. open groove 29 of the spindle 2 and a radial outer freeing position in which they are withdrawn from the bore 4 and the spindle 2 can be withdrawn from the bore 4.

Three angularly equispaced jaws 9 are slidable in angled and angularly equispaced guide passages 11 in the body 1 and have toothed outer edges 12 meshing with an internal screwthread of a tightening ring 13 bearing via balls 14 on a snap ring 15 fixed in the body 3. A tightening sleeve 16 coupled to the ring 13 can rotate on the body 3 about the axis 10 in one direction to advance the jaws 9 axially forward and radial together (down in FIG. 1) and in the opposite direction to retract the jaws 9 axially backward and radially outward (up in FIG. 1).

According to the invention a latch sleeve 8 is limitedly axially displaceable on the body 3 between a snap ring 25 set in the rear end of the body and an axially rearwardly facing shoulder 32. The sleeve 8 has an annular internal cam surface or formation 31 engageable with the balls 6 to push them into the holding position engaged in the groove 29. Displacement of the sleeve 8 axially forward from its illustrated latched position pulls the surface 31 out of engagement with the balls 6 and, instead, aligns an inwardly open groove or pocket 30 with them so they can move radially outward into their freeing positions.

A frustoconical coil spring 18 has a rear outer end engaging a shoulder 19 of the sleeve 8 and a front inner end engaging a snap ring 20 seated in the body 3. Thus this spring 18 continuously urges the sleeve 8 into the rear latched position maintaining the balls 6 in the holding position with the sleeve 8 bearing on the snap ring 25. The taper of the spring 18 corresponds exactly to the apex angle of the orbits of the jaws 9 so that this spring 18 is a very snug fit in the chuck 1. In addition the spring 18 lies wholly axially forward of the rear ends of the jaws 9 in the rear-end position shown to the left in FIG. 1. Thus this spring 18 and the latch sleeve 8 add nothing significant to the overall length or diameter of the chuck 1.

Figure 2:
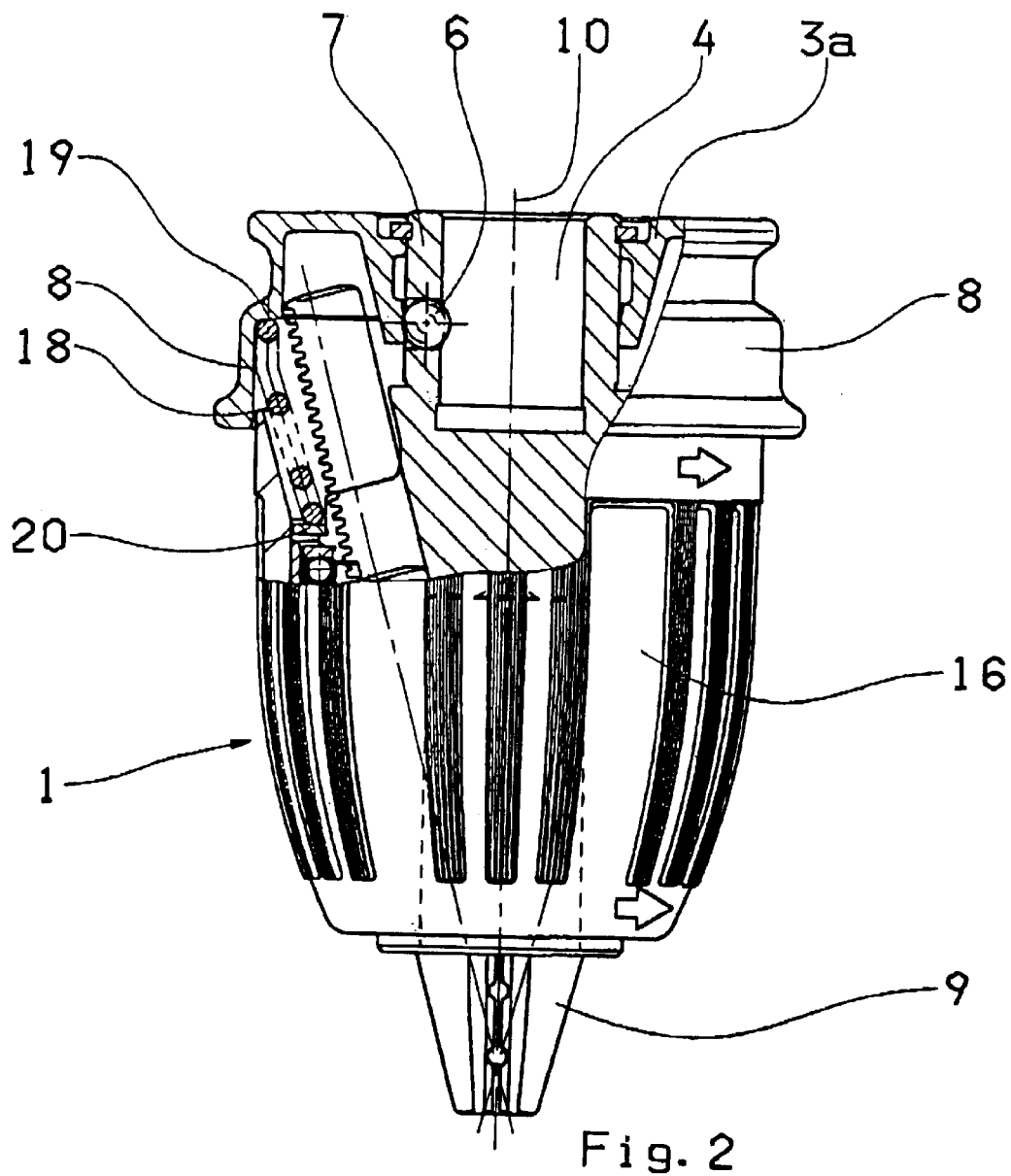
FIG. 2 is a view like FIG. 1 of a variant on the FIG. 1 chuck.

In FIG. 2 the structure is substantially identical to that of FIG. 1 but there is no faceted end part 5 on the hole 4. Instead the balls 6 engage in respective angularly limited pockets or the like so that these balls 6 rotationally couple the spindle to the chuck body 3.

Figure 3:
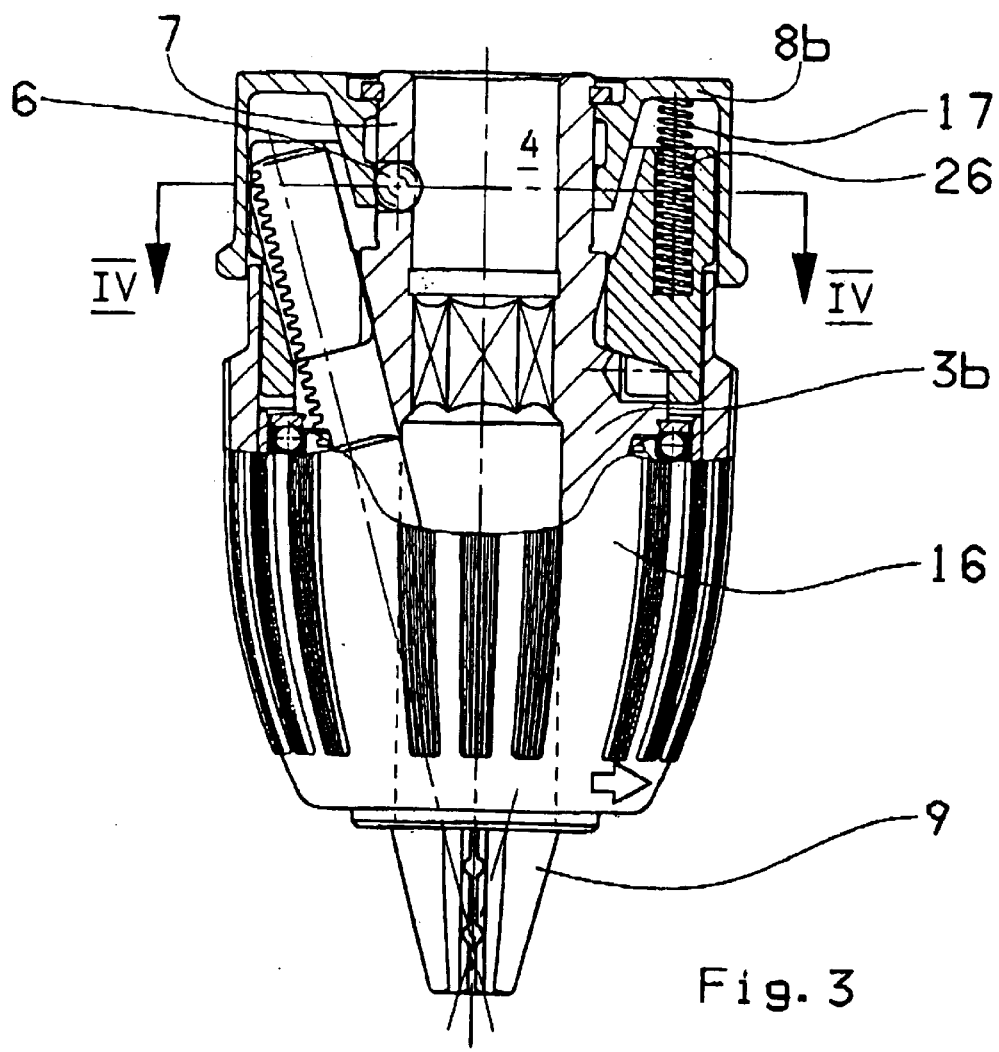
FIG. 3 is an axial section through a second chuck according to the invention.
Figure 4:
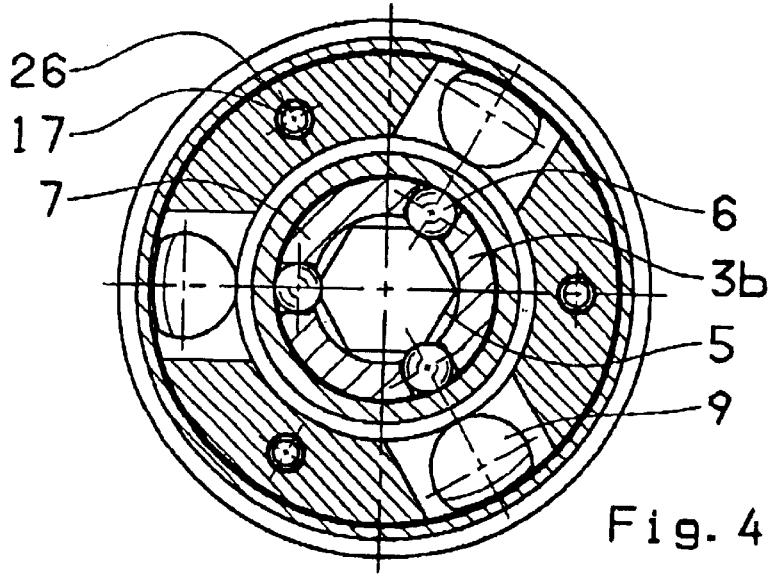
FIG. 4 is a section taken along line IV—IV of FIG. 3.

FIGS. 3 and 4 show a chuck body 3b formed between the jaws 9 with three axially rearwardly open blind bores or pockets 26 each receiving a respective cylindrical coil spring 17 bearing axially rearward on the sleeve 8b. Thus these springs 17 urge the sleeve 8b into the rear latched position. They lie mostly, that is more than half, forward of the rear ends of the jaws 9 in the rear-end position of these jaws 9.

Figure 5:
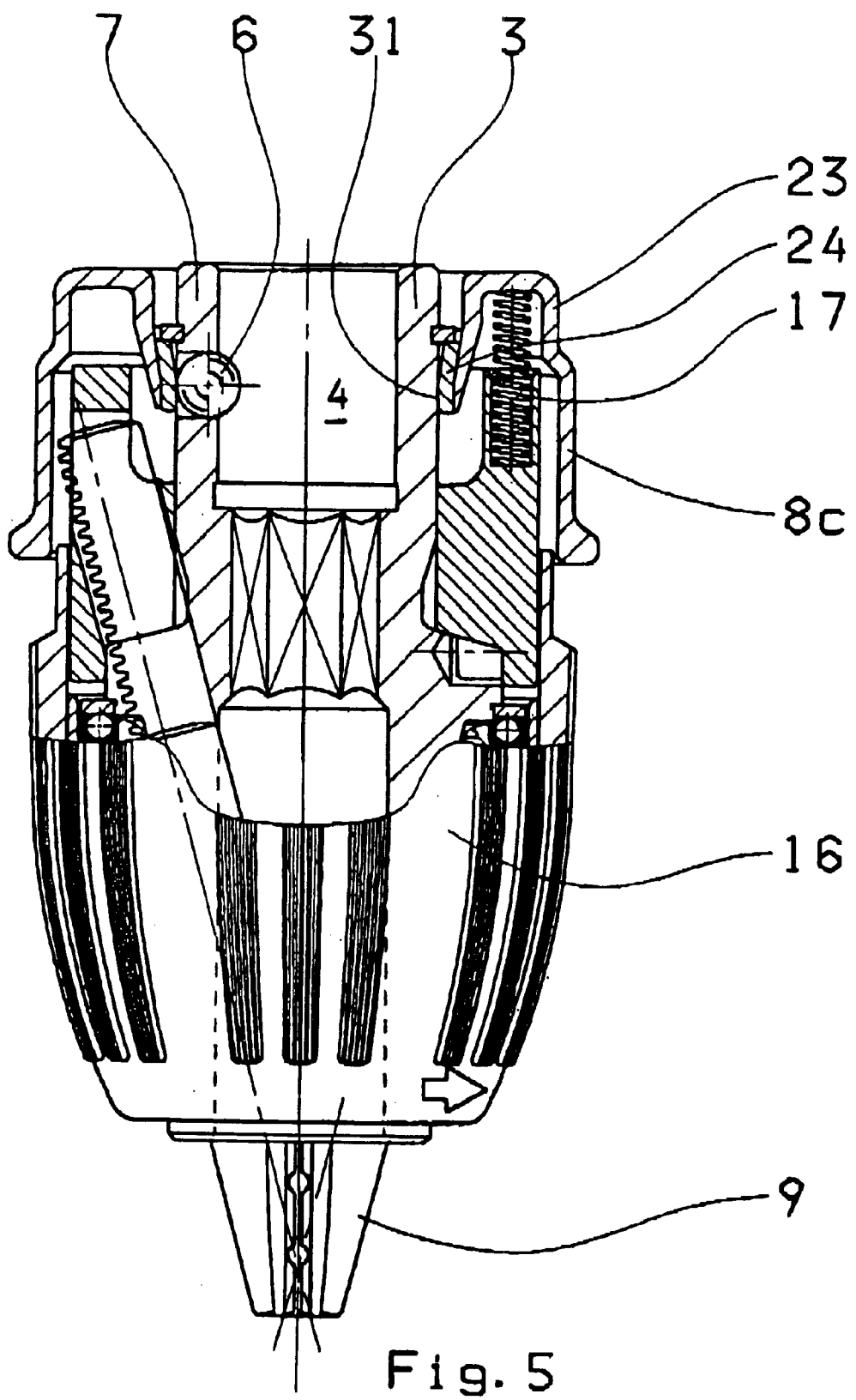
FIG. 5 is a view like FIG. 3 of a variant on the FIG. 3 chuck.

In FIG. 5 the structure is substantially identical to that of FIG. 3 except that the sleeve 8c has an outer plastic part 23 surrounding the body 3 and engaging the springs 17, and a metallic inner ring part 24 forming the cam surface 31.

Figure 6:
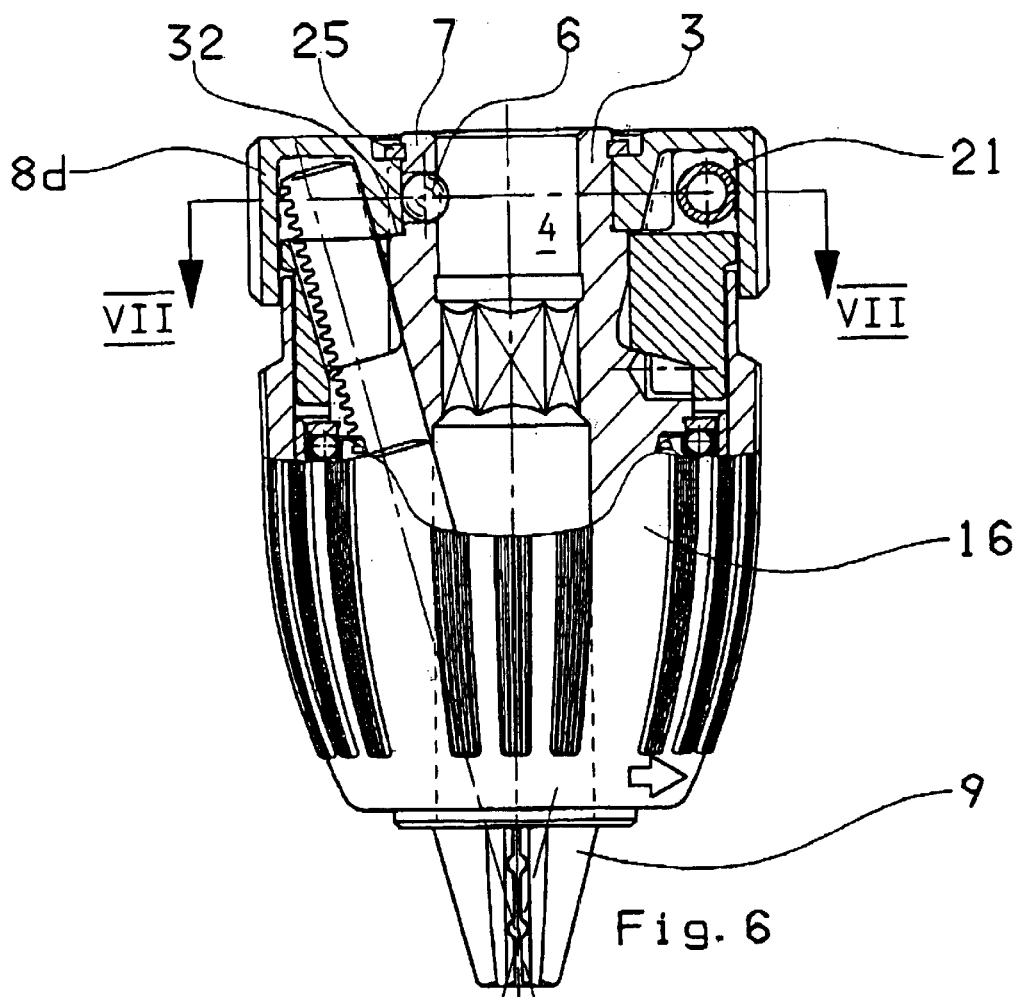
FIG. 6 is an axial section through a third chuck in accordance with the invention in a latched position of the chuck.
Figure 7:
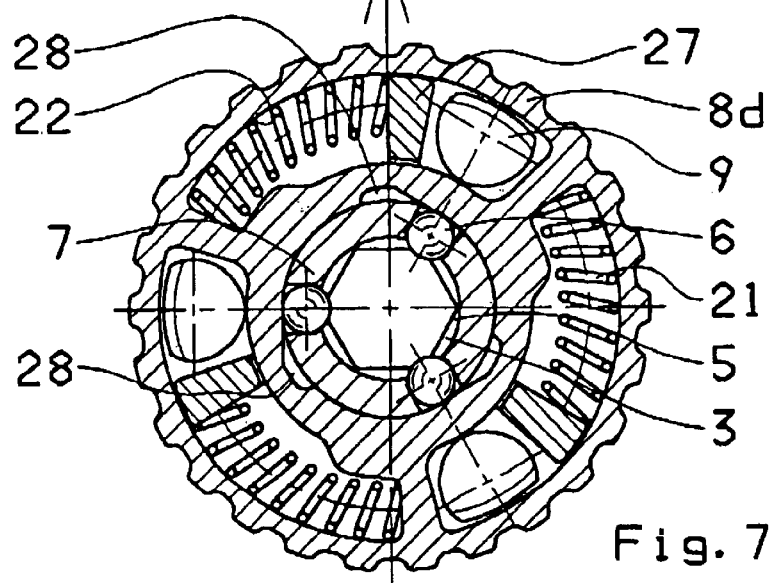
FIG. 7 is a section taken along line VII—VII of FIG. 6.

The chuck of FIGS. 6 through 9 has an angularly but not axially displaceable latch sleeve 8d forming pockets 22 with the chuck body 2, being snugly captured between the shoulder 32 and snap ring 25. Angularly extending springs 21 in these pockets 22 bear angularly between webs of the sleeve 8d and extensions 27 of the body 3 to urge the sleeve 8d angularly in a direction such its inner surface presses the balls 6 into the holding position as shown in FIGS. 6 and 7. Rotation of the sleeve 8d through a small angle as shown in FIGS. 8 and 9 aligns pockets 28 formed on the inner surface of this sleeve 8d with the balls 6 so they can shift outward into the freeing positions. Here the springs 21 are entirely forward of the rear ends of the jaws 9 in the rear-end positions of these jaws 9.

I claim:

1. A chuck releasably securable to a drive spindle, the chuck comprising:

a chuck body centered on an axis and formed with a rearwardly open bore adapted to fit with the drive spindle and a plurality of forwardly open, angularly spaced, and inwardly angled guides;

respective jaws displaceable in the guides between relatively widely spaced rear end positions and relatively closely spaced front end positions;

a ring rotatable on the body and meshing with the jaws for displacement of the jaws between their positions on rotation of the ring;

a latch element radially displaceable on the body between a holding position projecting radially into the bore and locking the spindle therein and a freeing position clear of the bore and permitting the spindle to withdraw from the bore;

a latch sleeve engageable with the latch element and displaceable on the body between a latched position forcing the element into the holding position and an unlatched position allowing the element to move into the freeing position; and a spring braced between the latch sleeve and the body and urging the latch sleeve into the latched position, the spring being mostly forward of rear ends of the jaws in the rear-end positions thereof.

2. The releasable chuck defined in claim 1 wherein the spring lies wholly forward of rear ends of the jaws in the rear-end positions thereof.

3. The releasable chuck defined in claim 1 wherein the sleeve is axially displaceable between its positions and the spring is a coil spring centered on the axis and having a rear end braced against the latch sleeve and front end braced against the chuck body.

4. The releasable chuck defined in claim 3 wherein the sleeve has a shoulder bearing on the rear end of the spring.

5. The releasable chuck defined in claim 3 wherein the chuck body is provided with a snap ring against which the front end of the spring bears.

6. The releasable chuck defined in claim 3 wherein the spring is of frustoconical shape with a taper corresponding to an angle the guides form with the axis.

7. The releasable chuck defined in claim 1 wherein the sleeve is angularly displaceable between its positions and the spring has one end braced angularly against the latch sleeve and an opposite end braced angularly against the chuck body.

8. The releasable chuck defined in claim 7 wherein there are a plurality of the springs and the sleeve and chuck body form respective angularly extending pockets receiving the springs.

9. The releasable chuck defined in claim 1 wherein the sleeve has a plastic outer part and a metallic inner part engageable with the element.

10. The releasable chuck defined in claim 1 wherein the element is a ball radially displaceable in a passage in the chuck body.

11. The releasable chuck defined in claim 10 wherein there are a plurality of the balls and passages angularly equispaced about the axis.

* * * * *